US008574120B2

(12) United States Patent
Saito et al.

(10) Patent No.: US 8,574,120 B2
(45) Date of Patent: Nov. 5, 2013

(54) VEHICLE DRIVING SYSTEM CONTROL APPARATUS

(71) Applicant: Denso Corporation, Kariya (JP)

(72) Inventors: Tomohiro Saito, Chiryu (JP); Hiroshi Okada, Kariya (JP); Hiroyuki Usami, Kariya (JP); Hitoshi Noguchi, Nishio (JP); Kazutoshi Nishinakamura, Chriyu (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 13/719,830

(22) Filed: Dec. 19, 2012

(65) Prior Publication Data

US 2013/0157807 A1  Jun. 20, 2013

(30) Foreign Application Priority Data

Dec. 20, 2011  (JP) ................................. 2011-277917

(51) Int. Cl.
*B60W 10/02* (2006.01)
*B60W 10/06* (2006.01)
*B60W 10/08* (2006.01)

(52) U.S. Cl.
USPC ............................................................ 477/5

(58) Field of Classification Search
USPC ................................ 477/5; 903/909, 946, 951
See application file for complete search history.

(56) References Cited

U.S. PATENT DOCUMENTS

| 6,007,443 A | 12/1999 | Onimaru et al. |
| 2004/0166980 A1* | 8/2004 | Supina et al. ...................... 475/5 |
| 2008/0146411 A1 | 6/2008 | Choi et al. |
| 2010/0210411 A1* | 8/2010 | Tang et al. ......................... 477/5 |
| 2011/0009236 A1* | 1/2011 | Yang et al. ......................... 477/5 |
| 2012/0006153 A1 | 1/2012 | Imamura et al. |

FOREIGN PATENT DOCUMENTS

| JP | 2000-297669 | 10/2000 |
| JP | 2000-303873 | 10/2000 |

OTHER PUBLICATIONS

U.S. Appl. No. 13/726,341 of Nishinakamura et al., filed Dec. 24, 2012.

\* cited by examiner

*Primary Examiner* — Edwin A Young
(74) *Attorney, Agent, or Firm* — Nixon & Vanderhye PC

(57) ABSTRACT

A vehicle driving system control apparatus includes a power transmission device and a power transmission control section. The power transmission device includes an engine input shaft, a motor input shaft, an output shaft, an engine-side gear mechanism transmitting a power of the engine input shaft to the output shaft, a motor-side gear mechanism transmitting a power of the motor input shaft to the output shaft, a first clutch enables and disables a power transmission between the engine input shaft and the motor input shaft, a second clutch enables and disables a power transmission between the motor-side gear mechanism and the output shaft, and a third clutch enables and disables a power transmission between the engine-side gear mechanism and the output shaft. The power transmission control section determines statuses of the clutches and required torques of motor generators in correspondence with a rotation speed of an axle.

10 Claims, 6 Drawing Sheets

FIG. 2A  $0 \leq Nd \leq N1$ (STOP TO LOW SPEED)
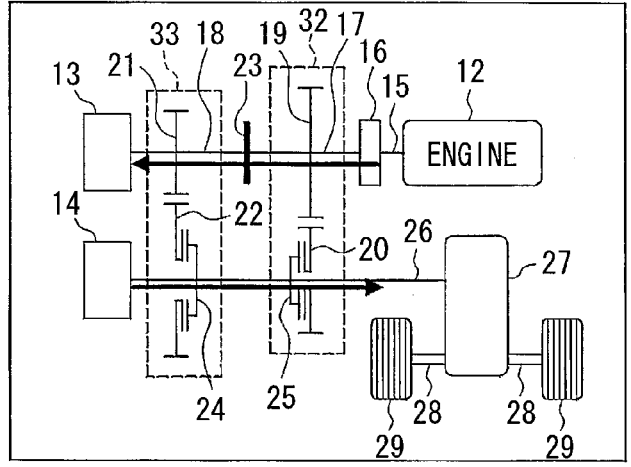
FIG. 2B  $N1 < Nd \leq N2$ (LOW SPEED TO INTERMEDIATE SPEED)
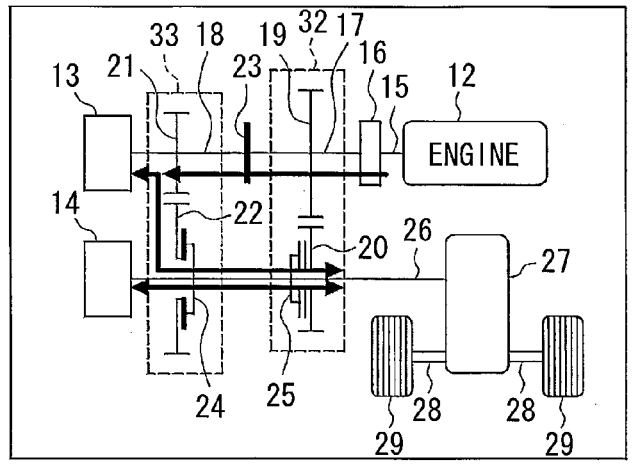
FIG. 2C  $N2 < Nd$ (INTERMEDIATE SPEED TO HIGH SPEED)
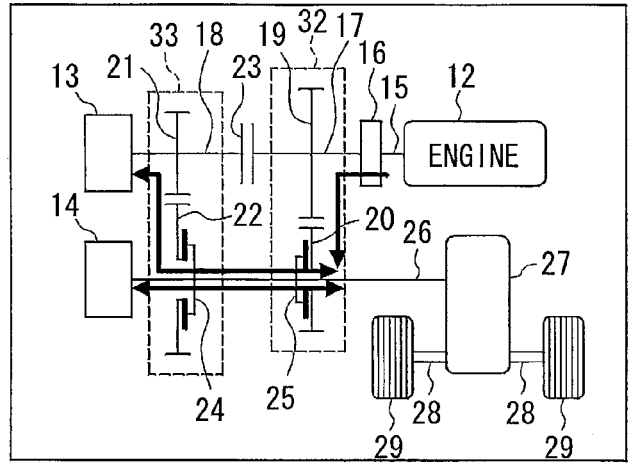

VEHICLE DRIVING SYSTEM CONTROL APPARATUS

CROSS REFERENCE TO RELATED APPLICATIONS

The present application is based on and claims priority to Japanese Patent Application No. 2011-277917 filed on Dec. 20, 2011, the contents of which are incorporated in their entirety herein by reference.

TECHNICAL FIELD

The present disclosure relates to a vehicle driving system control apparatus.

BACKGROUND

In recent years, in view of social requirements for low fuel consumption and low exhaust emission, a hybrid vehicle having an engine and a motor generator (MG) as a vehicle power source attracts attention. In the hybrid vehicle, as disclosed in, for example, JP-A-9-287490 (corresponding to U.S. Pat. No. 6,007,443), the MG is provided on a power transmission channel to transmit engine power to a driving shaft of the vehicle, and a transmission for automatically changing a transmission gear ratio in correspondence with MG rotation speed is provided between the engine and the MG. The fuel consumption is improved by controlling the engine rotation speed and the torque to constant values.

However, according to the above-described technique, because the MG rotation shaft and the vehicle driving shaft are always linked, it is difficult to drive the MG to generate power with the engine power during the vehicle stop. Further, in the worst case, there is a possibility that the vehicle cannot keep running due to reduction of a battery residual power. When a clutch is provided between the MG and the driving shaft as a countermeasure against the above-described difficulty, because it is necessary to control the clutch with high accuracy at vehicle starting, it is difficult to ensure a responsiveness of a driving torque. Thus, a starting performance may be deteriorated.

Japanese Patent No. 3,461,652 (corresponding to U.S. Pat. No. 6,007,443) discloses that a MG is driven to generate power with engine power during vehicle stop, by linking an engine output shaft, a MG rotation shaft and a vehicle driving shaft via planetary gear unit.

However, in the above-described technique, because the engine output shaft, the MG rotation shaft and the vehicle driving shaft are linked via the planetary gear unit, the structure of a power transmission system may be complicated or enlarged.

SUMMARY

It is an object of the present disclosure to provide a vehicle driving system control apparatus that can generate power with a motor generator during a vehicle stop and can secure a starting performance of a vehicle with a power transmission device having a simple configuration.

A vehicle driving system control apparatus according to an aspect of the present disclosure includes a power transmission device capable of transmitting a power of an engine, a power of a first motor generator, and a power of a second motor generator to an axle of a vehicle, and a power transmission control section.

The power transmission device includes an engine input shaft, a motor input shaft, an output shaft, an engine-side gear mechanism, a motor-side gear mechanism, a first clutch, a second clutch, and a third clutch. The engine input shaft transmits the power of the engine. The motor input shaft transmits the power of the first motor generator. The output shaft receives the power of the second motor generator and outputs the power to be transmitted to the axle. The engine-side gear mechanism transmits the power of the engine input shaft to the output shaft without the motor input shaft. The motor-side gear mechanism transmits the power of the motor input shaft to the output shaft without the engine input shaft. The first clutch is engaged and disengaged so as to enable and disable a power transmission between the engine input shaft and the motor input shaft. The second clutch is engaged and disengaged so as to enable and disable a power transmission between the motor-side gear mechanism and the output shaft. The third clutch is engaged and disengaged so as to enable and disable a power transmission between the engine-side gear mechanism and the output shaft.

The power transmission control section determines engagement and disengagement statuses of the first to third clutches and required torques of the first and second motor generators in correspondence with a rotation speed of the axle.

BRIEF DESCRIPTION OF THE DRAWINGS

Additional objects and advantages of the present disclosure will be more readily apparent from the following detailed description when taken together with the accompanying drawings. In the drawings:

FIGS. 2A to 2C are block diagrams explaining control of clutches and MGs in correspondence with an axle rotation speed Nd;

DETAILED DESCRIPTION

Figure 1:
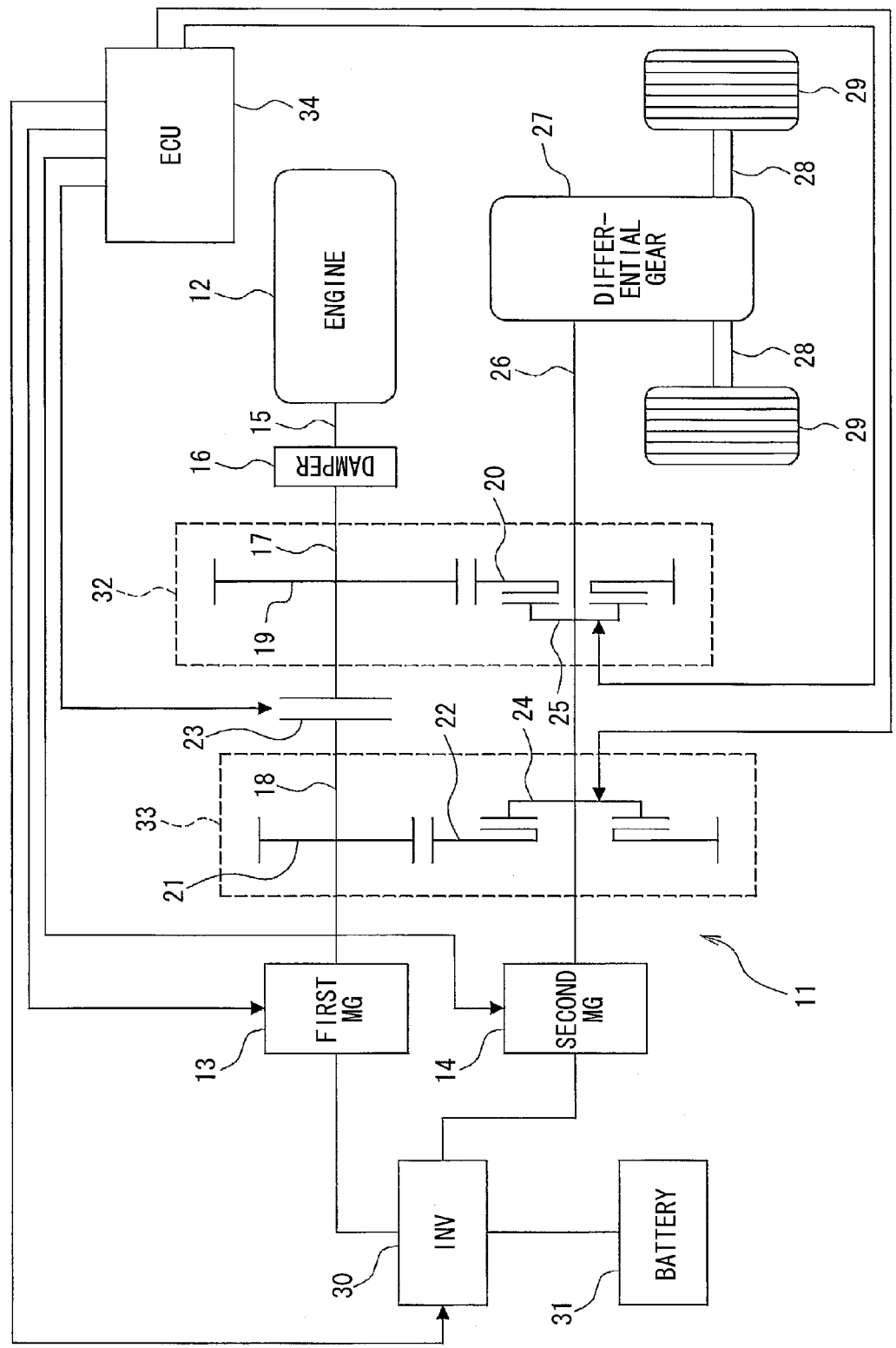
FIG. 1 is a block diagram showing a driving system of a hybrid vehicle according to an embodiment of the present disclosure.

Embodiments of the present disclosure will be described in accordance with the accompanying drawings. First, the configuration of a hybrid vehicle driving system will be briefly described based on FIG. 1.

A power transmission system 11 mounted on a hybrid vehicle includes an engine 12, a first motor generator (hereafter referred to as "first MG") 13, a second motor generator (hereafter referred to as "second MG") 14, a first engine input shaft 15, a damper 16, a second engine input shaft 17, a motor input shaft 18, an engine-side drive gear 19, an engine-side driven gear 20, a motor-side drive gear 21, a motor-side driven gear 22, a first clutch 23, a second clutch 24, a third clutch 25, an output shaft 26, and a differential gear 27. The power (i.e., driving torque) generated with the engine 12, the first MG 13, and the second MG 14 is transmitted to an axle 28. Accordingly, a driving force to a driving wheel 29 is generated with the transmitted power.

The first MG 13 and the second MG 14 are coupled to a battery 31 (accumulator battery) via an inverter (INV) 30. The first MG 13 and the second MG 14 supply and receive electric power to and from the battery 31 via the inverter 30. The engine 12 is an internal combustion engine. The first MG 13 and the second MG 14 are electric motors to rotate with the electric power from the battery 31. In addition, the first MG 13 and the second MG 14 are generators to generate power by utilizing shaft torque which is transmitted from the power transmission system 11 (more particularly, the motor input shaft 18 in the case of the first MG 13, or the output shaft 26 in the case of the second MG 14) and to charge the battery 31.

The power generated with the engine 12 is input to the first engine input shaft 15 extending from the engine 12. The first engine input shaft 15 functions as a shaft to transmit the power input from the engine 12. The damper 16 as a well-known torsion damper is attached to an end of the first engine input shaft 15 on the side opposite from the engine 12.

The second engine input shaft 17 is attached to the damper 16, on the side opposite from the engine input shaft 15, coaxially with the first engine input shaft 15. Accordingly, the second engine input shaft 17 transmits the power from the first engine input shaft 15 via the damper 16.

The engine-side drive gear 19 is attached on the second engine input shaft 17. The engine-side drive gear 19 rotates along with the second engine input shaft 17.

The power generated with the first MG 13 is input into the motor input shaft 18 extending from the first MG 13. The motor input shaft 18 functions as a shaft to transmit the power input from the first MG 13.

The motor-side drive gear 21 is attached on the motor input shaft 18. The motor-side drive gear 21 rotates along with the motor input shaft 18.

The second engine input shaft 17 and the motor input shaft 18 are provided in parallel and coaxially with each other. Further, the first clutch 23 is provided between the second engine input shaft 17 and the motor input shaft 18 as a clutch mechanism to mutually and coaxially couple and decouple the second engine input shaft 17 and the motor input shaft 18. As the first clutch 23, a wet clutch may be employed, or a dry clutch may be employed.

The power generated with the second MG 14 is input into the output shaft 26 extending from the second MG 14. The output shaft 26 is provided to the sides of the first engine input shaft 15, the second engine input shaft 17 and the motor input shaft 18, in parallel to the input shafts 15, 17 and 18. The output shaft 26 outputs power to be transmitted to the differential gear 27, the axle 28 and the like.

The engine-side driven gear 20 is engaged with the engine-side drive gear 19, and is rotatably supported by the output shaft 26. The third clutch 25 is attached to the output shaft 26, as a clutch mechanism to mutually couple and decouple the output shaft 26 and the engine-side driven gear 20. As the third clutch 25, a wet clutch may be employed, or a dry clutch may be employed. Also a positive clutch such as a synchromesh may be employed.

The motor-side driven gear 22 is engaged with the motor-side drive gear 21, and is rotatably supported by the output shaft 26. Further, the second clutch 24 is attached to the output shaft 26, as a clutch mechanism to mutually couple and decouple the output shaft 26 and the motor-side driven gear 22. As the second clutch 24, a wet clutch may be employed, or a dry clutch may be employed. Also a positive clutch such as a synchromesh may be employed.

The power from the output shaft 26 is transmitted to the driving wheel 29 via a final gear (not shown), the differential gear 27 and the axle 28.

The power transmission is performed between the output shaft 26 and the engine-side driven gear 20 by engaging the third clutch 25. Accordingly, the power transmission is performed between the second engine input shaft 17 and the output shaft 26 via the engine-side drive gear 19, the engine-side driven gear 20 and the third clutch 25 (without the motor input shaft 18). On the other hand, when the third clutch 25 is disengaged, the power transmission is not performed between the second engine input shaft 17 and the output shaft 26 via the engine-side drive gear 19 and the engine-side driven gear 20. The engine-side drive gear 19 and the engine-side driven gear 20 form a high gear mechanism 32 (corresponding to an example of an engine-side gear mechanism). The reduction gear ratio (gear ratio) of the high gear mechanism 32 is lower than the reduction gear ratio (gear ratio) of a low gear mechanism 33 to be described later.

The power transmission is performed between the output shaft 26 and the motor-side driven gear 22 by engaging the second clutch 24. Accordingly, the power transmission is performed between the motor input shaft 18 and the output shaft 26 via the motor-side drive gear 21, the motor-side driven gear 22 and the second clutch 24 (without the engine input shafts 15 and 17). On the other hand, when the second clutch 24 is disengaged, the power transmission is not performed between the motor input shaft 18 and the output shaft 26 via the motor-side drive gear 21 and the motor-side driven gear 22. The motor-side drive gear 21 and the motor-side driven gear 22 form the low gear mechanism 33 (corresponding to an example of a motor-side gear mechanism). The reduction gear ratio (gear ratio) of the low gear mechanism 33 is higher than the reduction gear ratio (gear ratio) of the high gear mechanism 32.

In the power transmission system 11, in the light of the power transmission channel and in the light of arrangement, the gear mechanism closer to the engine 12 is the high gear mechanism 32, and the gear mechanism closer to the first MG 13 is the low gear mechanism 33.

When the first clutch 23 is engaged, the power is transmitted between the second engine input shaft 17 and the motor input shaft 18 via the first clutch 23. When the first clutch 23 is disengaged, the power is not transmitted between the second engine input shaft 17 and the motor input shaft 18.

Furthermore, when the first clutch 23 is engaged, the power transmission is always possible from a position in the second engine input shaft 17 on which the engine-side drive gear 19 is provided to the position in the motor input shaft 18 on which the motor-side drive gear 21 is provided. In other words, no other clutch than the first clutch 23 exists in the power transmission channel from the position in the input shafts 15, 17 and 18 on which the engine-side drive gear 19 is provided to the position where the motor-side drive gear 21 is provided. In this arrangement, it is possible to reduce the number of clutches in comparison with conventional cases, and by extension, it is possible to downsize the power transmission system 11.

It is possible to reduce the distance from the engine 12 to the engine-side drive gear 19 by providing the first clutch 23 and the engine-side drive gear 19 between the motor-side drive gear 21 and the engine 12. As a result, it is possible to maintain high resistance against the torsional vibration of the engine input shafts 15, 17.

Furthermore, it is possible to reduce the distance from the first MG 13 to the motor-side drive gear 21 by providing the first clutch 23 and the motor-side drive gear 21 between the engine-side drive gear 19 and the first MG 13. As a result, it is possible to maintain high resistance against the torsional vibration of the motor input shaft 18.

An electronic control unit (ECU) 34 includes a microcomputer as a main body. The ECU 34 controls the power transmission channel for the power generated with the engine 12 and the first MG 13 and the reduction gear ratio, by controlling driving and non-driving of the first MG 13 and the second MG 14 and engagement and disengagement statuses of the first to third clutches 23 to 25, based on respective physical quantities obtained in the vehicle.

The ECU 34 inputs various signals such as a vehicle speed detected with a vehicle speed sensor (not shown), an accelerator opening (accelerator operation amount) detected with an accelerator sensor (not shown), a state of charge (SOC) of the battery 31 detected with a battery monitor (not shown), and an engine speed detected with a crank angle sensor (not shown).

The ECU 34 controls the engagement and disengagement statuses of the first to third clutches 23 to 25 based on these input signals. More particularly, the ECU 34 controls operation of actuators provided for the respective clutches 23 to 25 (e.g., an actuator to generate hydraulic pressure for engaging and disengaging the clutch) so as to control engagement and disengagement statuses of the clutches 23 to 25.

By the control of the clutches 23 to 25 with the ECU 34, the power generated with the first MG 13 can be transmitted to the driving wheel 29 via the low gear mechanism 33 and can be transmitted to the driving wheel 29 via the high gear mechanism 32. Furthermore, the power generated with the engine 12 can be transmitted to the driving wheel 29 via the low gear mechanism 33 and can be transmitted to the driving wheel 29 via the high gear mechanism 32.

In the present embodiment, the engagement and disengagement statuses of the respective clutches 23 to 25 and the required torques of the respective MGs 13 and 14 are determined in correspondence with rotation speed Nd of the axle 28 by executing a power transmission control routine to be described later in FIGS. 6 and 7 with the ECU 34, as follows.

A first rotation speed N1 and a second rotation speed N2 for determining the region of the rotation speed Nd of the axle 28 are set within the respective ranges satisfying the following conditions (where N1<N2).

$$N\min/\rho l/\rho f \leq N1 \leq N\max/\rho l/\rho f$$

$$N\min/\rho h/\rho f \leq N2 \leq N\max/\rho h/\rho f$$

Note that Nmin is the minimum rotation speed (e.g. idle rotation speed) of the engine 12, and the Nmax is the maximum rotation speed of the engine 12. Further, $\rho l$ is the gear ratio of the low gear mechanism 33, $\rho h$ is the gear ratio of the high gear mechanism 32, and $\rho f$ is a final gear ratio.

During the operation of the engine 12, a required torque Te of the engine 12 is set to a constant value. Accordingly, the torque of the engine 12 can be maintained at the constant value, the fuel consumption can be improved, and an exhaust emission can be reduced.

As shown in FIG. 2A, during the operation of the engine 12, when the rotation speed Nd of the axle 28 is equal to or lower than the first rotation speed N1 (i.e., when 0≤Nd≤N1), the first clutch 23 is engaged and the second and third clutches 24 and 25 are disengaged. Accordingly, in a low speed region where the rotation speed Nd of the axle 28 is equal to or lower than the first rotation speed N1 (including the vehicle stop status), the power transmission between the engine 12 and the output shaft 26 of the first MG 13 is disabled, then it is possible to drive the first MG 13 with the power of the engine 12 to generate power and it is possible to drive the output shaft 26 with the power of the second MG 14 to run the vehicle.

In this case, a required torque Tmg1 of the first MG 13 is set to the same value of a required torque Te of the engine 12, and a required torque Tmg2 of the second MG 14 is set based on a required torque To of the output shaft 26. Accordingly, it is possible to maintain constant torque of the engine 12 and realize the required torque To of the output shaft 26 with the second MG 14.

As shown in FIG. 2B, during the operation of the engine 12, when the rotation speed Nd of the axle 28 is higher than the first rotation speed N1 and equal to or lower than the second rotation speed N2 (i.e., when N1<Nd≤N2), the respective clutches 23 to 25 are controlled so as to transmit the power of the engine 12 to the output shaft 26 via the low gear mechanism 33 (the gear mechanism having a higher gear ratio). More particularly, the first and second clutches 23 and 24 are engaged while the third clutch 25 is disengaged. Accordingly, in a low speed-to-intermediate speed region where the rotation speed Nd of the axle 28 is higher than the first rotation speed N1 and equal to or lower than the second rotation speed N2, the power of the engine 12 is transmitted to the output shaft 26 via the low gear mechanism 33.

In this case, a MG required power Pmg (=total value of a required power of the first MG 13 and a required power of the second MG 14) is calculated based on a target power Pe of the engine 12 and required power Po of the output shaft 26 determined from the gear ratio $\rho l$ of the low gear mechanism 33. Accordingly, the MG required power Pmg, necessary to realize the required power Po of the output shaft 26 in the low speed-to-intermediate speed region during the operation of the engine 12, is set with high accuracy. Thereafter, the required torque Tmg1 of the first MG 13 and the required torque Tmg2 of the second MG 14 are calculated based on the MG required power Pmg, using an MG optimum operation point map to be described later. Accordingly, the required torque Tmg1 of the first MG 13 and the required torque Tmg2 of the second MG 14 are set such that MG total loss (=total value of loss of the first MG 13 and loss of the second MG 14) becomes a minimum value in the low speed-to-intermediately speed region during the operation of the engine 12.

As shown in FIG. 2C, during the operation of the engine 12, when the rotation speed Nd of the axle 28 is higher than the second rotation speed N2 (i.e., when N2<Nd), the respective clutches 23 to 25 are controlled to transmit the power of the engine 12 to the output shaft 26 via the high gear mechanism 32 (the gear mechanism having a lower gear ratio). More particularly, the first clutch 23 is disengaged and the second and third clutches 24 and 25 are engaged. Accordingly, in intermediate speed-to-high speed region where the rotation speed Nd of the axle 28 is higher than the second rotation speed N2, the power of the engine 12 is transmitted to the output shaft 26 via the high gear mechanism 32.

In this case, the MG required power Pmg is calculated based on the target power Pe of the engine 12 and the required power Po of the output shaft 26 determined from the gear ratio $\rho h$ of the high gear mechanism 32. Accordingly, the MG required power Pmg, necessary to realize the required power Po of the output shaft 26 in the intermediate speed-to-high speed region during the operation of the engine 12, is set with high accuracy. Thereafter, the required torque Tmg1 of the first MG 13 and the required torque Tmg2 of the second MG 14 are calculated based on the MG required power Pmg, using the MG optimum operation point map to be described later. Accordingly, the required torque Tmg1 of the first MG 13 and the required torque Tmg2 of the second MG 14 are set such that the MG total loss becomes a minimum value in the intermediate speed-to-high speed region during the operation of the engine 12.

On the other hand, during operation stop status of the engine 12 (combustion stop status), the first clutch 23 and third clutch 25 are disengaged, and the second clutch 24 is engaged. Accordingly, it is possible to drive the output shaft 26 to run the vehicle with one or both of the first MG 13 and the second MG 14. In addition, it is possible to drive one or both of the first MG 13 and the second MG 14 to generate power with the power of the output shaft 26 driven with the power of the axle 28.

In this case, the MG required power Pmg is set to the same value of the required power Po of the output shaft 26, so as to set the MG required power Pmg necessary to realize the required power Po of the output shaft 26 during the operation stop status of the engine 12, with high accuracy. Thereafter, the required torque Tmg1 of the first MG 13 and the required torque Tmg2 of the second MG 14 are calculated based on the MG required power Pmg, using the MG optimum operation point map to be described later. Accordingly, the required torture Tmg1 of the first MG 13 and the required torque Tmg2 of the second MG 14 are set such that the MG total loss becomes a minimum value during the operation stop status of the engine 12.

Next, a method for generating the MG optimum operation point map will be described. The MG optimum operation point map is previously generated in designing stage or manufacturing stage and is stored in a ROM of the ECU 34.

[Calculation of MG Operation Point Candidate]

The MG required power Pmg upon power running can be represented using a maximum torque Tmg1.max of the first MG 13 (see FIG. 3), a rotation speed Nmg1 of the first MG 13, a maximum torque Tmg2.max of the second MG 14 (see FIG. 3) and a rotation speed Nmg2 of the second MG 14, with the following equation (1).

$$Pmg=2\pi/60 \times (\rho l \times \eta \times X \times Tmg1.\max \times Nmg1/\rho l + Y \times Tmg2.\max \times Nmg2) \quad (1)$$

Note that X is a torque load ratio of the first MG 13, Y is a torque load ratio of the second MG 14, and η is a gear efficiency of the low gear mechanism 33.

Further, a maximum required power Pmg1.max of the first MG 13 and a maximum required power Pmg2.max of the second MG 14 can be respectively represented with the following equations (2) and (3).

$$Pmg1.\max = 2\pi/60 \times Tmg1.\max \times Nmg1 \quad (2)$$

$$Pmg2.\max = 2\pi/60 \times Tmg2.\max \times Nmg2 \quad (3)$$

The equation (1) can be deformed as the following equation (4) using the relation in the equations (2) and (3).

$$Pmg=\eta \times X \times Pmg1.\max + Y \times Pmg2.\max \quad (4)$$

Assuming that Z(Nmg1)=Pmg1.max (Nmg1)/Pmg2.max (Nmg1), the equation (4) can be deformed as the following equation (5).

$$Pmg=\eta \times X \times (1+Y/Z) \times Pmg1.\max \quad (5)$$

By solving the equation (5) regarding Y, the following equation (6) can be obtained.

$$Y(X)=-Z \times X + Z \times Pmg/(\eta \times Pmg1.\max) \quad (6)$$

On the other hand, the MG required power Pmg upon regeneration can be represented with the following equation (7).

$$Pmg=1/\eta \times X \times Pmg1.\max + Y \times Pmg2.\max \quad (7)$$

By solving the equation (7) regarding Y, the following equation (8) can be obtained.

$$Y(X)=-Z \times X + Z \times \eta \times Pmg/Pmg1.\max \quad (8)$$

[Determination of MG Optimum Operation Point]

Figure 4:
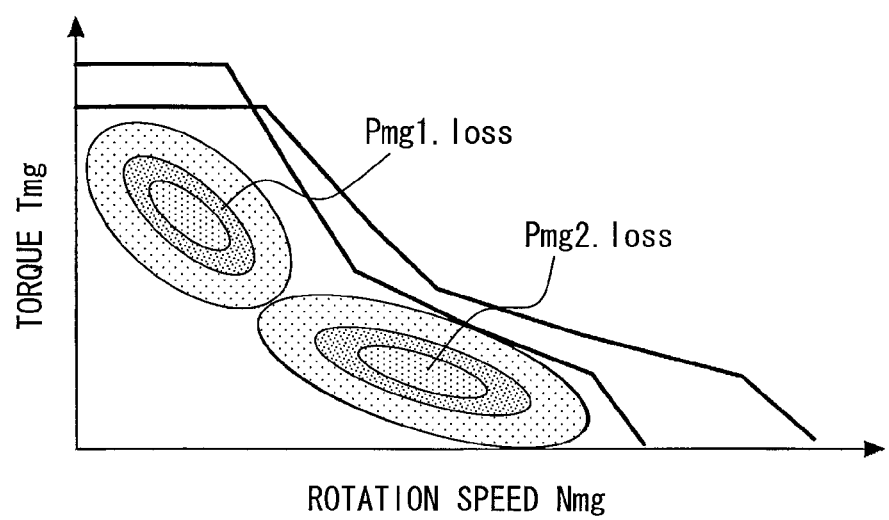
FIG. 4 is a diagram showing an example of an MG loss map.

Regarding the equation (6) representing the relation between X and Y upon power running and the equation (8) representing the relation between X and Y upon regeneration, the loss Pmg1.loss of the first MG 13 (X×Tmg1.max, Nmg1) and the loss Pmg2.loss of the second MG 14 (Y×Tmg2.max, Nmg2) in the possible X and Y are calculated using the MG loss map (see FIG. 4). The MG loss map is generated based on test data, design data and the like.

Thereafter, using the loss Pmg1.loss of the first MG 13 (X×Tmg1.max, Nmg1) and the loss Pmg2.loss of the second MG 14 (Y×Tmg2.max, Nmg2), the MG total loss Pmg.loss is calculated with the following equation.

$$Pmg.\text{loss}=Pmg1.\text{loss}(X \times Tmg1.\max, Nmg1) + Pmg2.\text{loss}(Y \times Tmg2.\max, Nmg2)$$

The torque load ratio X of the first MG 13 when the MG total loss Pmg.loss is the minimum is calculated as an MG optimum operation point Xopt. Then, a map that defines the MG optimum operation point (see FIG. 5) and the relation among the MG optimum operation point Xopt, the MG required power Pmg and the rotation speed Nmg1 of the first MG 13 is generated, and is stored in the ROM of the ECU 34.

The power transmission control routine performed by the ECU 34 according to the present embodiment will be described with reference to FIGS. 6 and 7.

Figure 6:
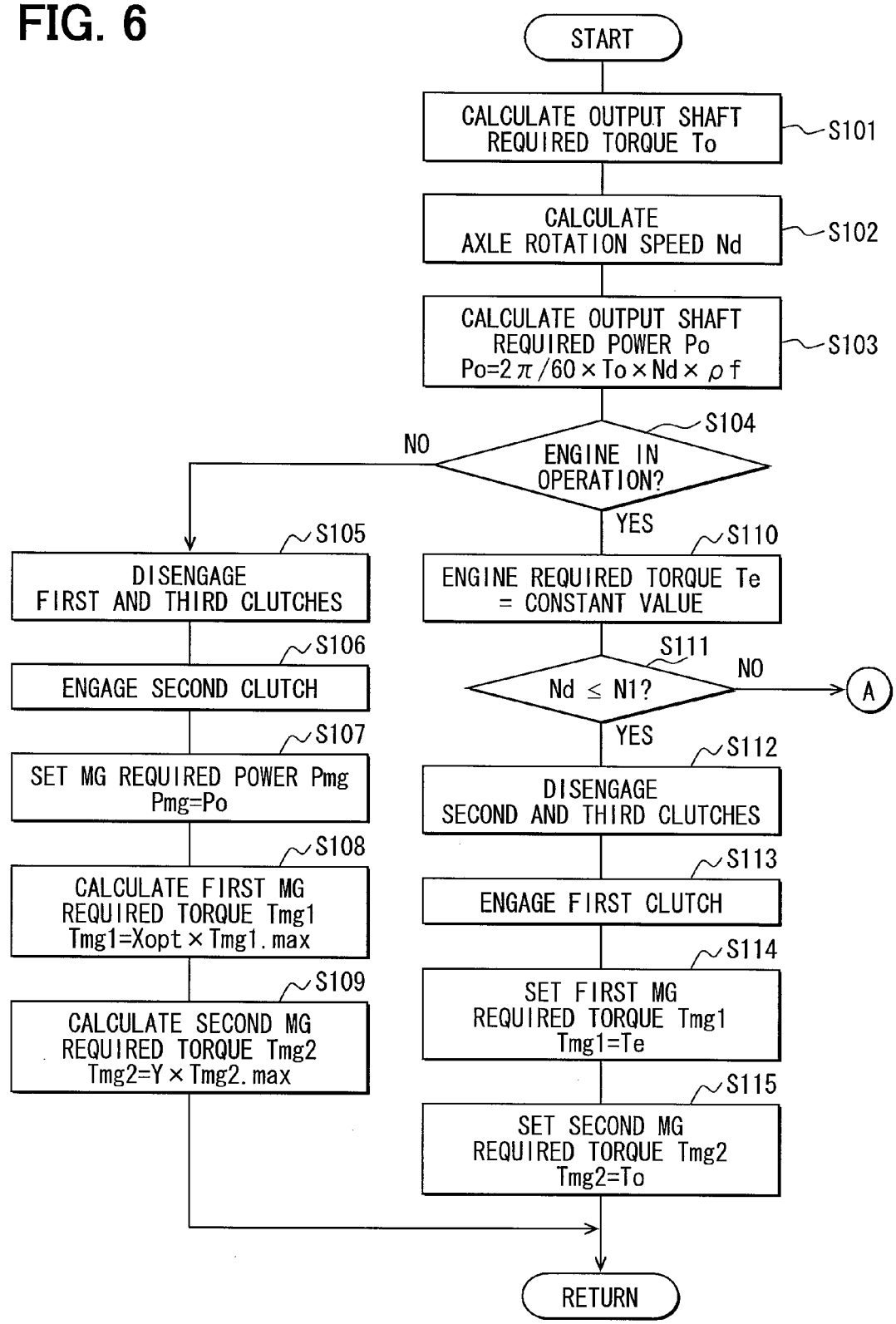
FIG. 6 is a flowchart showing a part of a power transmission control routine.
Figure 7:
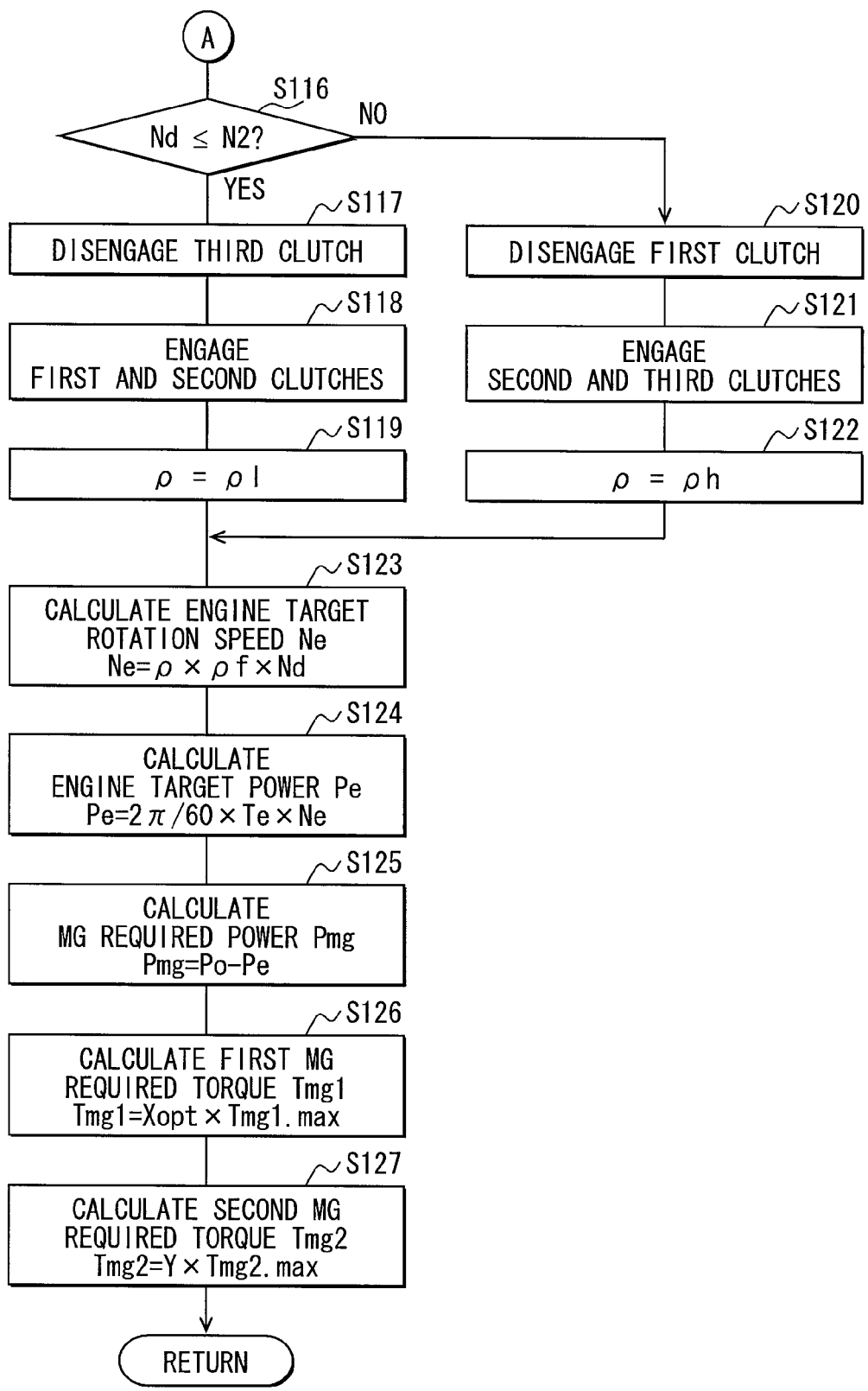
FIG. 7 is a flowchart showing another part of the power transmission control routine.

The power transmission control routine shown in FIGS. 6 and 7 is repeatedly performed at predetermined periodic intervals during a power-on period of the ECU 34, to play a role of a power transmission control section. When the present routine is started, first, at S101, the required torque To of the output shaft 26 is calculated by using a map, mathematical expression or the like based on the accelerator opening detected with the accelerator sensor, the vehicle speed detected with the vehicle speed sensor and the like.

Then the process proceeds to S102, at which the rotation speed Nd of the axle 28 is calculated based on the vehicle speed detected with the vehicle speed sensor. When the rotation speed Nd of the axle 28 is detected with the vehicle speed sensor, the rotation speed Nd of the axle 28 is read.

Then the process proceeds to S103, at which the required power Po of the output shaft 26 is calculated with the following equation, using the required torque To of the output shaft 26, the rotation speed Nd of the axle 28 and the final gear ratio ρf.

$$Po=2\pi/60 \times To \times Nd \times \rho f$$

Then the process proceeds to S104, at which it is determined whether the engine 12 is in operation. When it is determined that the engine 12 is not in operation (i.e., the operation of the engine 12 is stopped), the process proceeds to S105, at which the first and third clutches 23 and 25 are disengaged. Then the process proceeds to S106, at which the second clutch 24 is engaged. Accordingly, it is possible to drive the output shaft 26 to run the vehicle with one or both of the first MG 13 and the second MG 14, and to drive one or both of the first MG 13 and the second MG 14 to generate power with the power from the output shaft 26 driven with the power of the axle 28.

Then the process proceeds to S107, at which the MG required power Pmg is set to the same value as that of the required power Po of the output shaft 26, so as to set the MG required power Pmg necessary to realize the required power Po of the output shaft 26 during the operation stop of the engine 12, with high accuracy.

$$Pmg = Po$$

Figure 3:
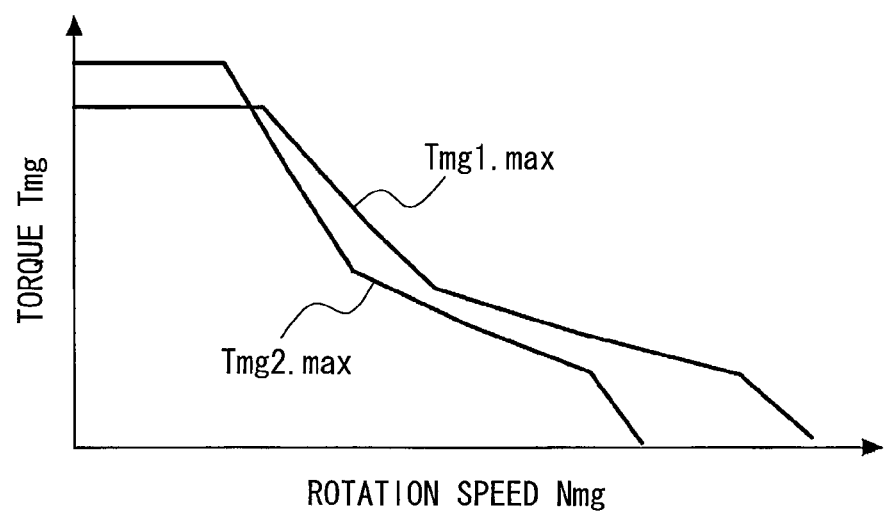
FIG. 3 is a diagram showing an example of an MG maximum torque map.
Figure 5:
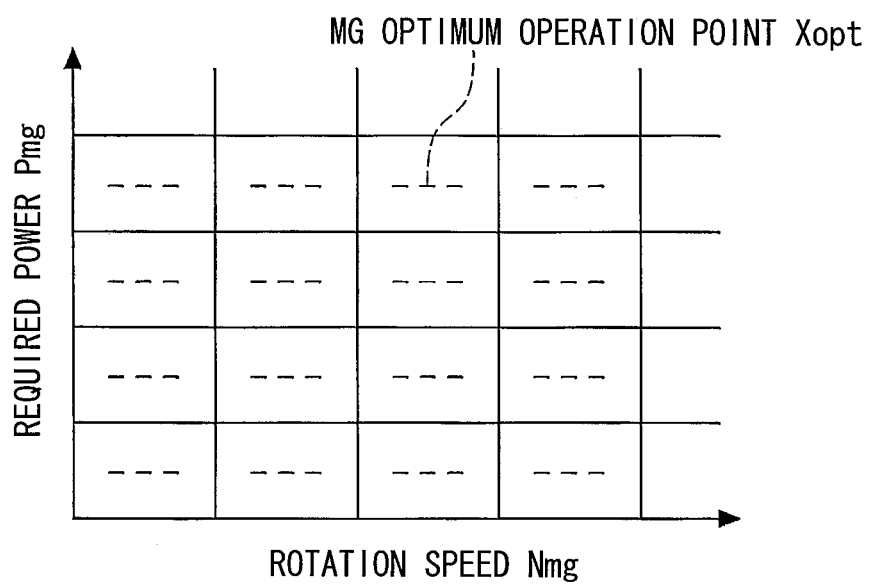
FIG. 5 is a diagram showing an example of an MG optimum operation point map.

Then the process proceeds to S108, at which the maximum torque Tmg1.max of the first MG 13 corresponding to the rotation speed Nmg1 of the first MG 13 is calculated by using an MG maximum torque map shown in FIG. 3, and the MG optimum operation point Xopt corresponding to the MG required power Pmg and the rotation speed Nmg1 of the first MG 13 is calculated by using the MG optimum operation point map shown in FIG. 5. Then the required torque Tmg1 of the first MG 13 is calculated by using the MG optimum operation point Xopt and the maximum torque Tmg1.max of the first MG 13, with the following equation.

$$Tmg1 = Xopt \times Tmg1.\max$$

The MG maximum torque map shown in FIG. 3 is previously generated based on the test data, the design data and the like and is stored in the ROM of the ECU 34. Further, the MG optimum operation point map shown in FIG. 5 is previously generated by the above-described method and is stored in the ROM of the ECU 34.

Then the process proceeds to S109, at which the maximum torque Tmg2.max of the second MG 14 corresponding to the rotation speed Nmg2 of the second MG 14 is calculated by using the MG maximum torque map shown in FIG. 3, and a torque load ratio Y of the second MG 14 corresponding to the MG optimum operation point Xopt is calculated, by using the equation (6) upon power running and by using the equation (8) upon regeneration. Then the required torque Tmg2 of the second MG 14 is calculated by using the torque load ratio Y of the second MG 14 and the maximum torque Tmg2.max of the second MG 14, with the following equation.

$$Tmg2 = Y \times Tmg2.\max$$

The required torque Tmg1 of the first MG 13 and the required torque Tmg2 of the second MG 14 are set at S108 and S109 such that the MG total loss becomes a minimum during the operation stop of the engine 12.

On the other hand, when it is determined at S104 that the engine 12 is in operation, the process proceeds to S110, at which the required torque Te of the engine 12 is set to a constant value, to maintain constant torque of the engine 12, and to enable improvement in the fuel consumption and reduction of exhaust emission.

$$Te = \text{constant value}$$

Then the process proceeds to S111, at which it is determined whether or the rotation speed Nd of the axle 28 is equal to or lower than the first rotation speed N1. When it is determined at S111 that the rotation speed Nd of the axle 28 is equal to or lower than the first rotation speed N1 (i.e., when 0≤Nd≤N1), it is determined that the current speed region is in the low speed region (including vehicle stop). Then the process proceeds to S112, at which the second and third clutches 24 and 25 are disengaged. Then the process proceeds to S113, at which the first clutch 23 is engaged. Accordingly, in the low speed region (including vehicle stop), in a status where the power transmission from the engine 12 and the first MG 13 is isolated with respect to the output shaft 26, it is possible to drive the first MG 13 to generate power with the power of the engine 12, and to drive the output shaft 26 to run the vehicle with the power of the second MG 14.

Then the process proceeds to S114, at which the required torque Tmg1 of the first MG 13 is set to the same value as the required torque Te of the engine 12.

$$Tmg1 = Te$$

Then the process proceeds to S115, at which the required torque Tmg2 of the second MG 14 is set to the same value as the required torque To of the output shaft 26.

$$Tmg2 = To$$

Accordingly, it is possible to realize the required torque To of the output shaft 26 with the second MG 14 while maintaining a constant torque of the engine 12.

On the other hand, when it is determined at S111 that the rotation speed Nd of the axle 28 is higher than the first rotation speed N1, the process proceeds to S116 in FIG. 7, at which it is determined whether the rotation speed Nd of the axle 28 is equal to or lower than the second rotation speed N2.

When it is determined at S116 that the rotation speed Nd of the axle 28 is equal to or lower than the second rotation speed N2 (i.e., when N1<Nd≤N2), it is determined that the current speed is in the low speed-to-intermediate speed region. The process proceeds to S117, at which the third clutch 25 is disengaged. Then the process proceeds to S118, at which the first and second clutches 23 and 24 are engaged. Accordingly, in the low speed-to-intermediate speed region, it is possible to transmit the power of the engine 12 to the output shaft 26 via the low gear mechanism 33.

Then the process proceeds to S119, at which a calculation gear ratio ρ, used in calculation of a target rotation speed Ne of the engine 12 at S123 to be described later, is set to the gear ratio ρl of the low gear mechanism 33.

$$\rho = \rho l$$

On the other and, when it is determined at S116 that the rotation speed Nd of the axle 28 is higher than the second rotation speed N2 (i.e., when N2<Nd), it is determined that the current speed is in an intermediate speed-to-high speed region. The process proceeds to S120, at which the first clutch 23 is disengaged. Then the process proceeds to S121, at which the second and third clutches 24 and 25 are engaged. Accordingly, in the intermediate speed-to-high speed region, it is possible to transmit the power of the engine 12 to the output shaft 26 via the high gear mechanism 32.

Then the process proceeds to S122, at which the calculation gear ratio ρ used in the calculation of the target rotation speed Ne of the engine 12 at S123 to be described later is set to the gear ratio ph of the high gear mechanism 32.

$$\rho = \rho h$$

Then the process proceeds to S123, at which the target rotation speed Ne of the engine 12 is calculated by using the calculation gear ratio ρ, the final gear ratio pf and the rotation speed Nd of the axle 28, with the following equation.

$$Ne = \rho \times pf \times Nd$$

Then the process proceeds to S124, at which the target power Pe of the engine 12 is calculated by using the required torque Te and the target rotation speed Ne of the engine 12 with the following equation.

$$Pe = 2\pi/60 \times Te \times Ne$$

Then the process proceeds to S125, at which the MG required power Pmg is calculated by using the required power Po of the output shaft 26 and the target power Pe of the engine 12 with the following equation, to set the MG required power Pmg necessary to realize the required power Po of the output shaft 26 with high accuracy.

$$Pmg = Po - Pe$$

Then the process proceeds to S126, at which the maximum torque Tmg1.max of the first MG 13 corresponding to the rotation speed Nmg1 of the first MG 13 is calculated by using the MG maximum torque map shown in FIG. 3, and the MG optimum operation point Xopt corresponding to the MG required power Pmg and the rotation speed Nmg1 of the first MG 13 is calculated by using the MG optimum operation point map shown in FIG. 5. Then the required torque Tmg1 of the first MG 13 is calculated by using the MG optimum operation point Xopt and the maximum torque Tmg1.max of the first MG 13, with the following equation.

$$Tmg1 = Xopt \times Tmg1.\max$$

Then the process proceeds to S127, at which the maximum torque Tmg2.max of the second MG 14 corresponding to the rotation speed Nmg2 of the second MG 14 is calculated by using the MG maximum torque map shown in FIG. 3, and the torque load ratio Y of the second MG 14 corresponding to the MG optimum operation point Xopt is calculated by using the equation (6) upon power running and by using the equation (8) upon regeneration. Then the required torque Tmg2 of the second MG 14 is calculated by using the torque load ratio Y of the second MG 14 and the maximum torque Tmg2.max of the second MG 14, with the following equation.

$$Tmg2 = Y \times Tmg2.\max$$

The required torque Tmg1 of the first MG 13 and the required torque Tmg2 of the second MG 14 are set such that the MG total loss becomes a minimum in the low speed-to-intermediate speed region and the intermediate speed-to-high speed region during the operation of the engine 12 by the processes at S126 and S127.

In the above-described embodiment, because it is possible to disable the power transmission from the engine 12 and the first MG 13 with respect to the output shaft 26, it is possible to drive the first MG 13 to generate power with the power of the engine 12 during the vehicle stop. Further, upon vehicle starting, it is possible to ensure the response of driving torque and to ensure the starting performance by driving the output shaft 26 to start the vehicle with the power of the second MG 14. Further, because it is not necessary to provide the power transmission system 11 with a complicated gear mechanism such as a planetary gear unit, it is possible to simplify and downsize the structure of the power transmission system 11. Further, it is possible to appropriately control the respective clutches 23 to 25 and the respective MGs 13 and 14 in correspondence with rotation speed of the axle 28 by determining the engagement and disengagement statuses of the respective clutches 23 to 25 and the required torques of the respective MGs 13 and 14.

What is claimed is:

1. A vehicle driving system control apparatus comprising a power transmission device capable of transmitting a power of an engine, a power of a first motor generator, and a power of a second motor generator to an axle of a vehicle, and
a power transmission control section,
wherein the power transmission device includes:
an engine input shaft transmitting the power of the engine;
a motor input shaft transmitting the power of the first motor generator;
an output shaft receiving the power of the second motor generator and outputting the power to be transmitted to the axle;
an engine-side gear mechanism transmitting the power of the engine input shaft to the output shaft without the motor input shaft;
a motor-side gear mechanism transmitting the power of the motor input shaft to the output shaft without the engine input shaft;
a first clutch being engaged and disengaged so as to enable and disable a power transmission between the engine input shaft and the motor input shaft;
a second clutch being engaged and disengaged so as to enable and disable a power transmission between the motor-side gear mechanism and the output shaft; and
a third clutch being engaged and disengaged so as to enable and disable a power transmission between the engine-side gear mechanism and the output shaft, and
wherein the power transmission control section determines engagement and disengagement statuses of the first to third clutches and required torques of the first and second motor generators in correspondence with a rotation speed of the axle.

2. The vehicle driving system control apparatus according to claim 1,
wherein the power transmission control section sets a required torque of the engine to a constant value during operation of the engine.

3. The vehicle driving system control apparatus according to claim 2,
wherein, when the rotation speed of the axle is equal to or lower than a predetermined first rotation speed, the power transmission control section engages the first clutch and disengages the second and third clutches.

4. The vehicle driving system control apparatus according to claim 3,
wherein the power transmission control section sets the required torque of the first motor generator to a same value as the required torque of the engine, and sets the required torque of the second motor generator based on a required torque of the output shaft.

5. The vehicle driving system control apparatus according to claim 2,
wherein, when the rotation speed of the axle is higher than the predetermined first rotation speed and is equal to or lower than a predetermined second rotation speed, the power transmission control section controls the first to third clutches to transmit the power of the engine to the output shaft via one of the engine-side gear mechanism and the motor-side gear mechanism having a higher gear ratio.

6. The vehicle driving system control apparatus according to claim 5,
wherein the power transmission control section calculates required powers of the first and second motor generators based on a target power of the engine determined from a gear ratio of the one of the engine-side gear mechanism and the motor-side gear mechanism to transmit the power of the engine to the output shaft and a required power of the output shaft.

7. The vehicle driving system control apparatus according to claim 6,
wherein the power transmission control section previously stores a map of an optimum operation point at which a total loss of the first and second motor generators becomes a minimum, and calculates the required torques of the first and second motor generators by using the map based on the required powers of the first and second motor generators.

8. The vehicle driving system control apparatus according to claim 2,
wherein, when the rotation speed of the axle is higher than the predetermined second rotation speed, the power transmission control section controls the first to third clutches to transmit the power of the engine to the output shaft via one of the engine-side gear mechanism and the motor-side gear mechanism having a lower gear ratio.

9. The vehicle driving system control apparatus according to claim 1,
wherein the power transmission control section disengages the first and third clutches and engages the second clutch during operation stop of the engine.

10. The vehicle driving system control apparatus according to claim 9,
wherein the power transmission control section sets required powers of the first and second motor generators to a same value as a required power of the output shaft.

* * * * *